United States Patent
Mishkevich et al.

[11] Patent Number: 5,949,162
[45] Date of Patent: Sep. 7, 1999

[54] UNBALANCED FORCE GENERATION IN MOTORS

[75] Inventors: Victor G. Mishkevich, Bridgewater; Gregory Weston Terpay, Whippany; George G. Zipfel, Jr., Summit, all of N.J.

[73] Assignee: General Dynamics Advanced Technology Systems, Inc., McLeansville, N.C.

[21] Appl. No.: 08/771,554

[22] Filed: Dec. 13, 1996

[51] Int. Cl.$^6$ .................................................. H02K 5/24
[52] U.S. Cl. ............................................. 310/51; 318/623
[58] Field of Search ....................... 31/51, 90.5; 318/150, 318/161, 611, 623

[56] References Cited

U.S. PATENT DOCUMENTS

| | | | |
|---|---|---|---|
| 2,777,105 | 1/1957 | Larsen | 318/611 |
| 2,849,671 | 8/1958 | Stefan | 318/611 |
| 4,219,767 | 8/1980 | Wimmer | 318/696 |
| 5,202,824 | 4/1993 | Chen | 318/623 |
| 5,424,595 | 6/1995 | Preston et al. | 310/90.5 |
| 5,627,440 | 5/1997 | Yamamoto et al. | 318/611 |
| 5,636,193 | 6/1997 | Ohmi | 318/611 |

FOREIGN PATENT DOCUMENTS

| 2406790 | 8/1975 | Germany | 310/90.5 |
|---|---|---|---|

*Primary Examiner*—Clayton LaBalle
*Attorney, Agent, or Firm*—Jenner & Block

[57] ABSTRACT

In many uses of electrical motors, the interaction of a tool being powered, e.g., a milling machine, and the workpiece being worked on by the motor induces mechanical vibrations which adversely affect the functioning of the tool as well as inducing wear producing vibrations in the motor rotor shaft. Damping of such vibrations is achieved by deliberately inducing internal unbalanced forces on the motor rotor shaft for counteracting the externally induced vibrations. Such internal unbalanced forces are produced by the use of additional currents in the main stator coils for generating additional, unbalanced force generating magnetic fields. A mathematical analysis of the process is provided.

19 Claims, 9 Drawing Sheets

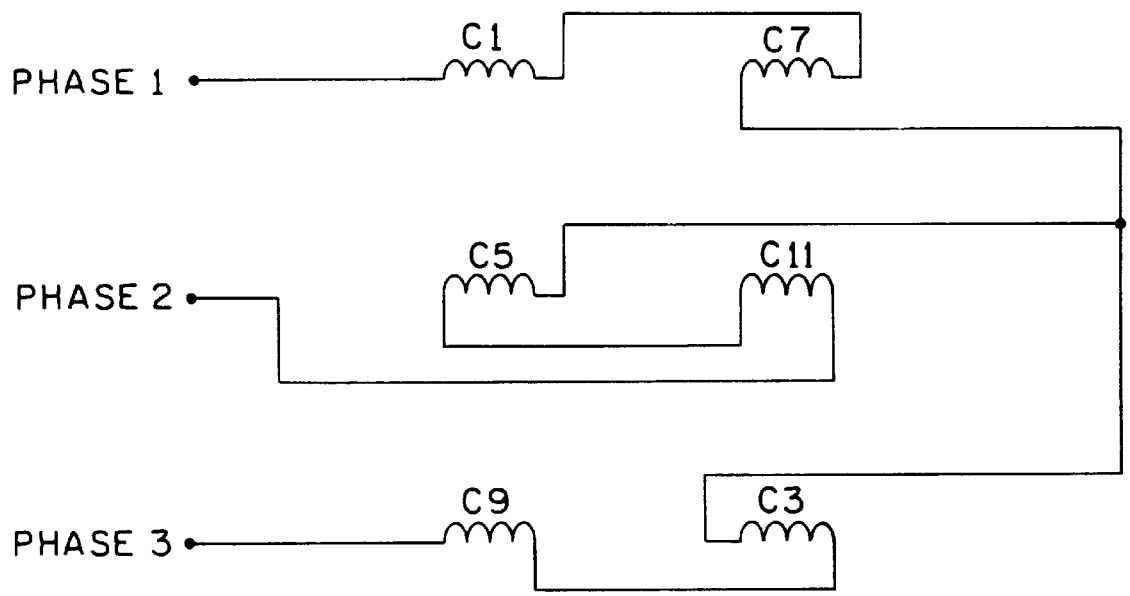
FIG. 8
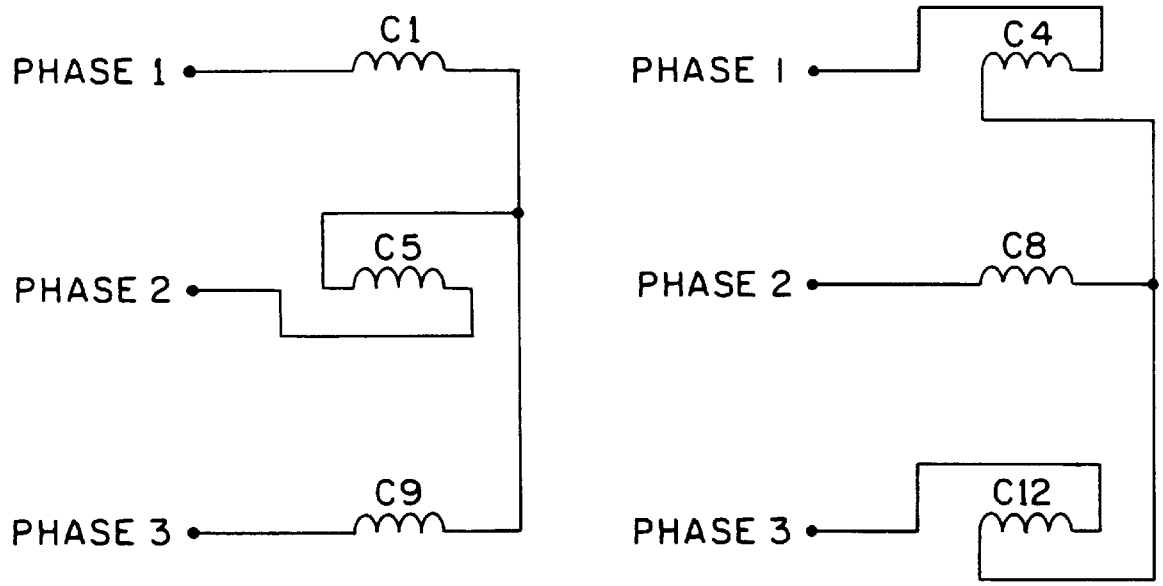
FIG. 9
FIG. 10

UNBALANCED FORCE GENERATION IN MOTORS

GOVERNMENT CONTRACT

This invention was made with government support under PO Z50039 of Prime Contract SP090094C0010. The government has certain rights in this invention.

BACKGROUND OF THE INVENTION

This invention relates to electrical induction motors and particularly to means for inducing internal unbalanced forces on the rotors of motors for damping and counteracting external forces on the motor rotors or shafts.

Ideal electrical induction motors develop mechanical torque only, i.e., balanced rotating tangential forces tending only to cause rotation of the motor rotor. All other forces, namely transverse and longitudinal forces on the motor rotor, are zero. This results from geometrical and axial symmetry of the rotor, air gap and magnetic fluxes. Radial forces exist, but they are balanced and cause only internal stress in the rotor. Accordingly, with proper design, ideal motor rotors rotate perfectly smoothly with no mechanical vibrations in any direction.

Matters change, however, when the motor rotors are connected for doing work. In milling machines, for example, vibration forces are generated during the cutting process which can deteriorate the surface of the workpiece and increase the roughness of the cut surface. Additionally, these vibrations can induce corresponding vibrations in the motor rotor, thereby causing wear of the motor bearings. The present invention is directed to the problem of reducing externally caused vibrations.

SUMMARY OF THE INVENTION

It is recognized that externally caused vibration fortes induce bending modes in the shafts of the induction motor powering various tools. In accordance with this invention, these externally induced bending forces are damped by the generation of counter-balancing internally induced forces on the motor rotors. Such internally induced forces are obtained by controlling the frequencies, phases and amplitudes of currents flowing through respective stator coils surrounding the motor rotor.

DESCRIPTION OF THE DRAWINGS

The Figures are schematic and not to scale.

FIGS. 7 and 8 are wiring diagrams showing how two separate groups of the coils shown in FIG. 6 can be interconnected for generating respective 2-pole rotating magnetic fields;

FIGS. 9–12 show how the twelve coils wired together as shown in FIG. 6 can be wired into four separate units of coils to provide 4-pole main and 2-pole two additive rotating magnetic fields;

FIGS. 15–26 are graphic representations of the relationships between various motor parameters as determined according to the aforementioned analysis, wherein:

FIG. 15 shows the sum of all stator currents as a function of angle θ in a stator fixed coordinate system;

FIG. 16 shows the total rotor current distribution as a function of angle θ in a stator fixed coordinate system;

FIG. 17 shows the radial and tangential components of the magnetic flux density at the rotor current sheet as a function of angle θ in a stator fixed coordinate system;

FIG. 18 shows the horizontal force Fx(t) as a function of the time history of the transverse force;

FIG. 19 shows the vertical force Fy(t) components of the transverse force;

FIG. 20 shows the ratio of Fx(t)/F(t) as a function of the time history of the transverse force;

FIG. 21 shows the ratio of Fy(t)/F(t) as a function of the time history of the transverse force;

FIGS. 22–25, show, as a function of phase angle, variations of the force components, in Newtons (N), of the transverse forces Fx (FIG. 22), Fy (FIG. 23), the resultant force F (FIG. 24), and (FIG. 25) the space orientation angle of the resultant force; and FIG. 26 shows the amplitude of the transverse force as a function of the additional coil currents.

DESCRIPTION OF PREFERRED EMBODIMENTS

Figure 1:
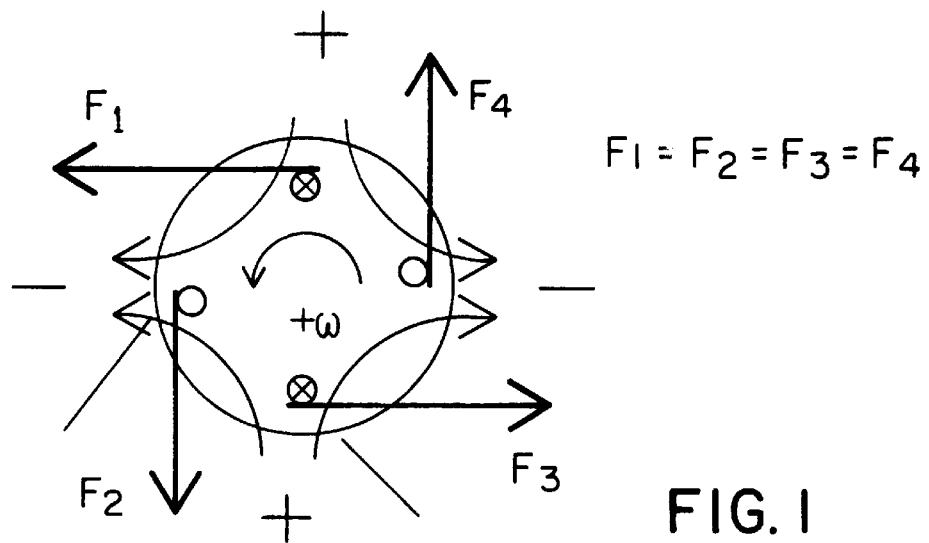
FIG. 1 is a cross-sectional view of a rotor of a known type of 4-pole induction motor illustrating the rotation causing transverse forces applied against the rotor resulting from rotating magnetic fields provided by typical stator current carrying coils.

As previously noted, ideal electrical induction motors develop mechanical torque only, i.e., balanced, rotating tangential forces tending only to cause rotation of the motor rotor or shaft. This is illustrated in FIG. 1 for a typical induction motor having a 4-pole stator winding. FIG. 1 illustrates transverse forces F1, F2, F3 and F4 generated on respective conductive bars 10 mounted on a motor rotor 12 by flowing an a.c. current through various stator coils mounted on the stator of the motor. The stator coils are not illustrated in FIG. 1, but the stator coils generate a rotating magnetic field indicated, at one instant of time in FIG. 1, by respective magnetic field lines 14 combining to produce a magnetic field rotating with angular velocity (_). The various tangential forces are equal (F1=F2=F3=F4), hence, balanced forces causing only rotation of the rotor 12 about its axis of rotation are produced.

However, when the rotor shaft is connected for driving a tool, e.g., a milling machine, the interaction of the cutting tool and a workpiece being machined can generate mechanical vibrations of both the cutting tool and the rotor shaft. Vibrations of the cutting tool causes variations in the contacting of the tool with the workpiece, hence increased roughness of the cut, and vibrations of the rotor shaft cause wear of the motor bearings and other undesired consequences.

In accordance with this invention, it has been determined that externally induced vibrations of a motor rotor shaft can be greatly damped by inducing unbalanced, internal transverse forces on the motor rotor which counteract the externally induced vibrations.

The damping process, typically, is quite dynamic, with the actual externally induced vibration modes varying from instant to instant. However, means are known, e.g., known eddy current sensors, for detecting the instantaneous lateral movements of a motor shaft. An example of a known eddy current sensor usable as a proximity sensor for detecting rotor shaft lateral vibrations is commercially available from Bently Nev., Kaman Instrumentation Corp. Accordingly, based upon comparisons of previously made tests on the identical motor, or comparable motors, it is possible, using computer analyses and/or look-up tables, to immediately recognize the vibration mode of the motor. Then, and again based upon previous tests (which can be on a trial and error basis), appropriately internally induced vibrations of the shaft can be generated which maximally dampen the externally induced vibrations.

What is required is a means for instantaneously and controllably inducing desired vibrations on a motor rotor. This is accomplished, according to the invention, by applying additional currents to various stator coils for generating one or more magnetic fields superimposed upon the "main" motor driving magnetic field.

Figure 2:
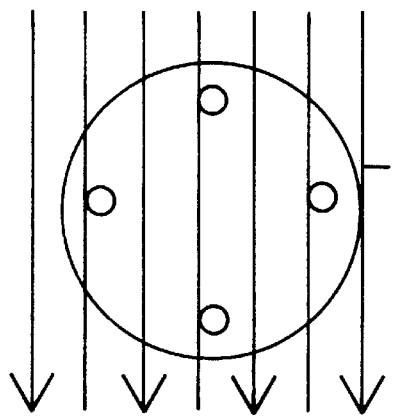
FIG. 2 is similar to FIG. 1 but shows only an additive magnetic field provided in accordance with this invention.

For example, in known 3-phase, 4-pole induction motors, properly phased and directed but otherwise identical "main" currents are caused to flow through all the stator coils for generating a rotating, 4-pole ("quadruple") "main" magnetic field as indicated in FIG. 1. However, if additional currents are driven through various selected stator coils (as hereinafter described), an additional 2-pole ("dipole") rotating magnetic field can be generated which is superimposed on the "main" magnetic field. The additional 2-pole, rotating field is shown by itself (at one instant in time) in FIG. 2. By itself, the 2-pole field induces additional currents in the rotor bars of the motor and the motor would operate as a conventional 2-pole, 3-phase induction motor.

Figure 3:
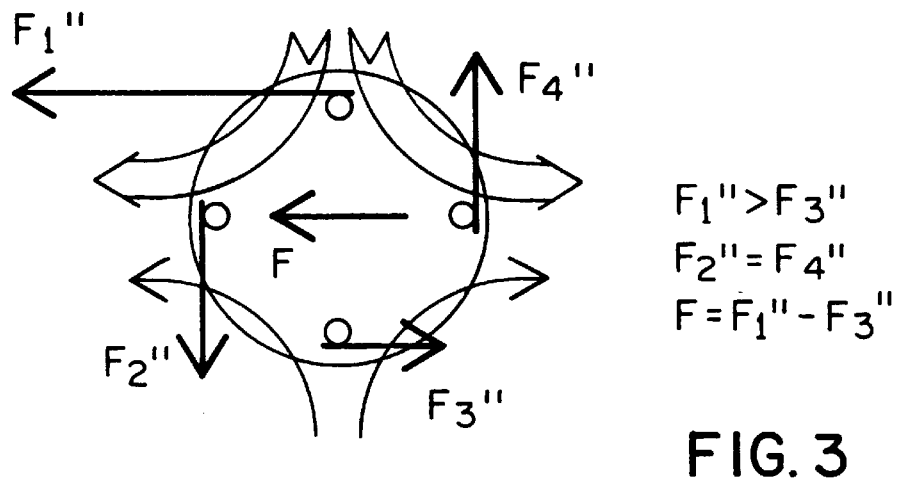
FIG. 3 is similar to FIG. 1 but shows the superposition of the two magnetic fields shown in FIGS. 1 and 2, respectively, for generation of an imbalanced transverse force.

The combined effect of the "main" field (FIG 1) and the additional field (FIG. 2) on the rotor bars is shown in FIG. 3. The additional currents in the rotor bars are superimposed upon the currents therein induced by the "main" rotating field, and the resulting forces on the various bars 10 of the rotor are F1", F2", F3" and F4". Due to redistribution of the magnetic fields and the rotor bar currents, F1" is greater than F3", F2" is approximately equal to F2, F4" is approximately equal to F4, and a net (unbalanced) force F results.

Both the additional and main fields are rotating, and the net, unbalanced force F also rotates. Both the magnitude and the rate of rotation of the unbalanced force F are functions of the frequency and phase relations between the main current flowing through the stator coils and the additional current flowing through the selected coils.

By varying the frequency of the additional current and adjusting its phase, a transverse, unbalanced force F with selected frequency and space orientation is obtainable.

Figure 4:
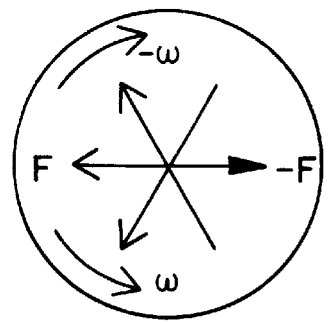
FIG. 4 illustrates the effect of providing, in accordance with this invention, two additive magnetic fields rotating in opposite directions for producing a non-rotating, fixed direction, but variable magnitude, transverse force.

Generally, for counteracting an externally induced vibration of the motor rotor shaft, a non-rotating transverse force F is desired. One means for obtaining a stationary-direction, variable-magnitude transverse force is the combination of a main rotating magnetic field with two additional fields of equal magnitude that rotate in opposite directions. Such oppositely rotating additional fields are obtained by superimposing "additional" currents upon the main currents that flow in all the stator coils. The additional currents are provided as currents of equal magnitudes but different frequencies. Each additional current flows through a different group of stator coils. For example, with a main current in all the stator coils at a frequency of f1, additional currents of frequency f2 are added (as hereinafter described) to the main current in one group of stator coils, and additional currents of frequency f3 are added to the main currents in another group of stator coils, where $f2=f1-f_F$ and $f3=f1+f_F$, where $f_F$ is the time frequency of the unbalanced force F. This results in a pair of transverse forces that rotate in opposite directions, as illustrated in FIG. 4. The resultant of these rotating forces is a transverse force F, in a stationary direction, but varying in magnitude between +F and −F at a frequency $f_F$. The magnitude of the transverse force F is proportional to the product of the main and additional coil currents. The time frequency $f_F$ of the transverse force is equal to the difference between the main and additional current frequencies. The direction of the transverse force F can be controlled by the phase angles between the main and additional currents.

As explained, the inventive method comprises deliberately creating internal unbalanced forces on a motor rotor by generating additional rotating magnetic fields superimposed upon a main rotating field. All the fields are created by the flow of selected currents through selected stator coils. This can be accomplished by various means, as now described.

The following descriptions are given in connection with 3-phase, 4-pole induction motors. The invention is not limited in use to such motors, but such motors are quite extensively used and persons of skill will be able to apply the concepts herein disclosed to other types of motors.

Figure 5:
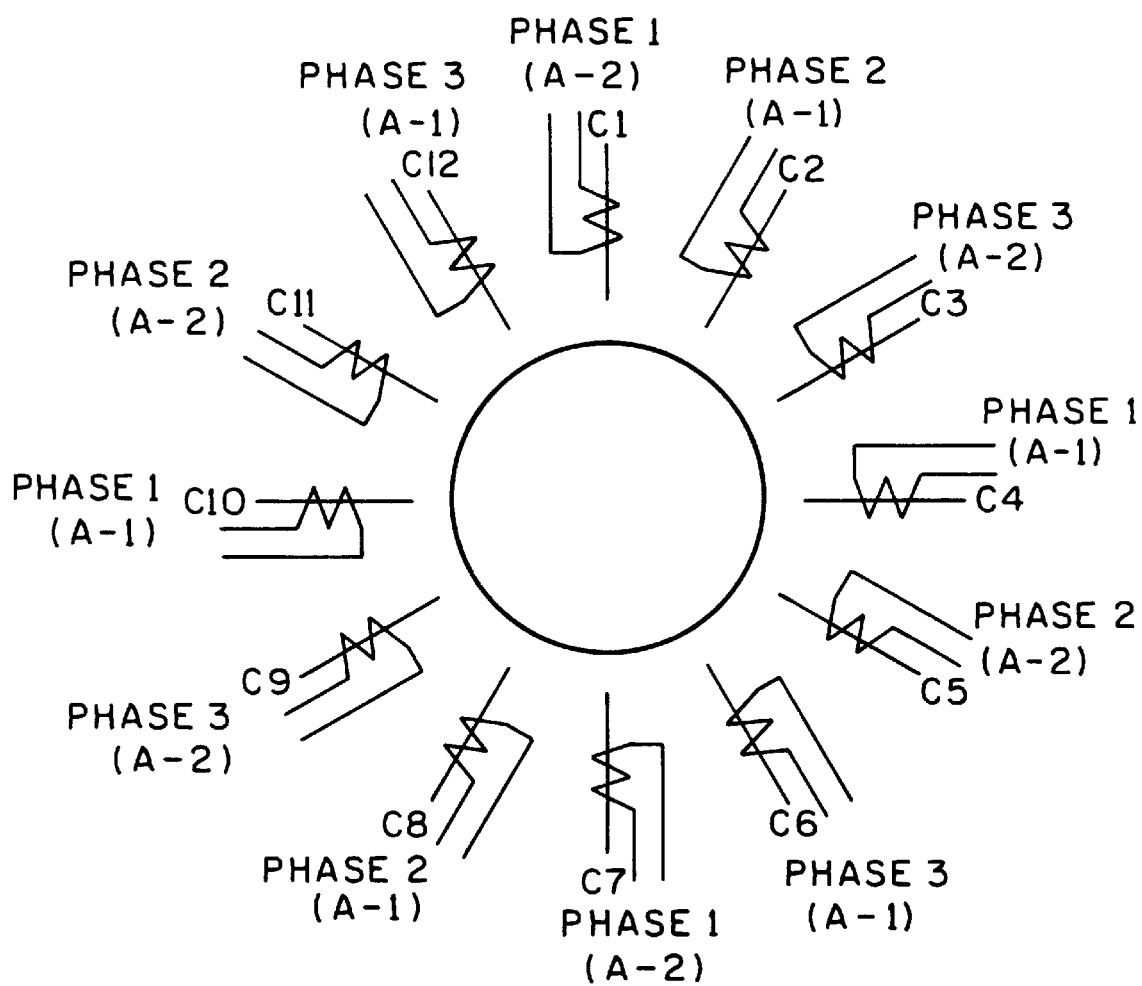
FIG. 5 shows an arrangement of stator coils in a motor of known type.

FIG. 5 is a schematic illustration of the stator winding of a known 3-phase, 4-pole induction motor having twelve stator coils disposed around the stator. The motor is driven by a 3-phase current power source and the numbered coils (C1–C12) are additionally identified by the current supply phase to which they are connected. The significance of the parenthetic legends (A-1), (A-2) etc., is described hereinafter. No attempt is made to show the actual winding configurations of the individual coils because many variations are known and used. Typically, for example, the coils are nested with one another with each coil overlapping two adjoining coils.

Figure 6:
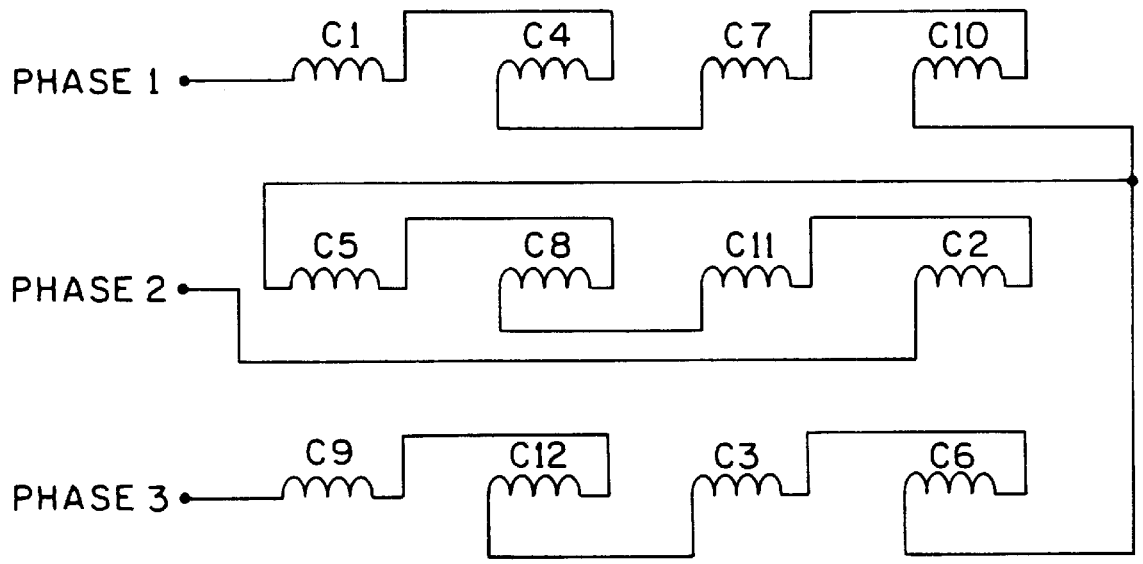
FIG. 6 is a wiring diagram showing how the stator coils shown in FIG. 5 are typically interconnected in known motors.

The stator coils generate a 4-pole rotating magnetic field (FIG. 1), and each phase of the current supply is directly connected to four serially connected coils (one coil per pole), as shown in FIG. 6. Additionally, the three groups of coils are typically interconnected within the motor either in a known "Y" or "delta" configuration. FIG. 6 shows a, "Y" configuration. As so wired, only three coil terminals (plus a ground connection) are externally accessible from the motor for connection to the 3-phase current supply. When "main" currents are caused to flow through the fixedly interconnected coils (in proper directions along the sides of the coils, as indicated by the different left-to-right coil connections shown in FIG. 6) a 4-pole rotating "main" magnetic field is generated. The foregoing is in accordance with known technology.

However, in accordance with one aspect of this invention, otherwise conventional 3-phase, 4-pole motors are modified for generating "additional" magnetic fields for the previously described purposes.

FIG. 5 shows each of the twelve coils with two terminals accessible externally of the motor. Normally, as previously described, only three terminals of internally interconnected coils are accessible. With the terminals of each coil accessible, clearly the twelve coils can be externally interconnected and energized as shown in FIG. 6 for conventional 4-pole operation.

Figure 7:
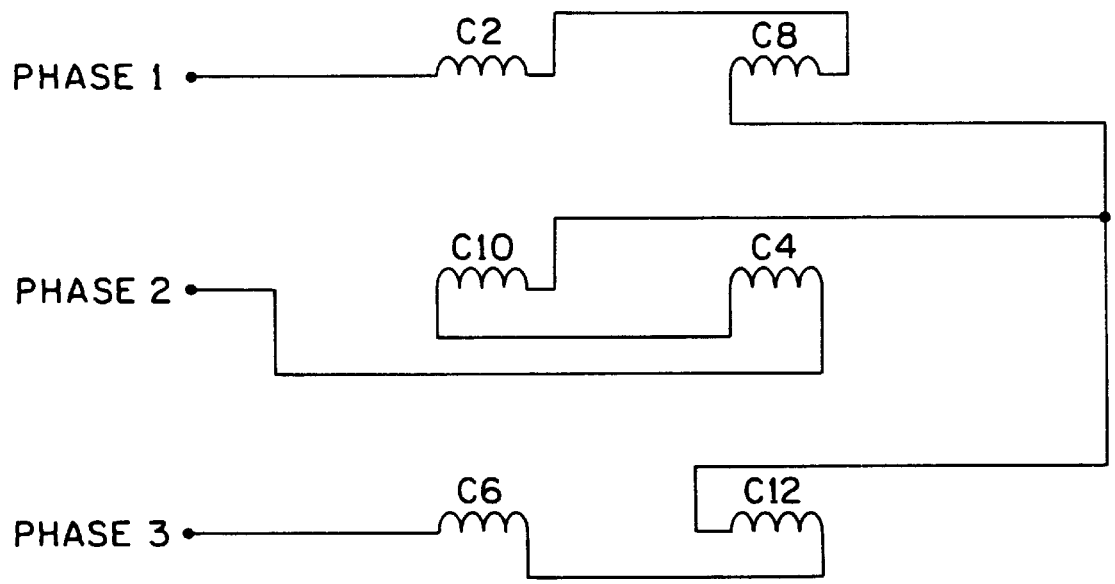

However, with the terminals of each coil externally accessible, "additional" currents can be flowed through selected coils for generating "additional" magnetic fields. FIG. 7, for example, shows a wiring diagram for six coils of a conventional 2-pole, 3-phase motor. Although the actual winding configuration of a 2-pole motor normally differs from that of a 4-pole motor, a 2-pole rotating magnetic field can be generated in a 4-pole motor by selectively driving six of the twelve coils of the 4-pole motor. One such selection of coils is indicated in FIG. 7 by the coil numbering scheme used. The 2-pole rotating field thus produced is referred to as the "first additional" field and the code A-1 is used in FIG. 5 to designate which coils (even numbered coils) are actually interconnected according to the wiring scheme shown in FIG. 7.

Likewise, a second additional rotating field can be generated by interconnecting a second group of six coils as indicated in FIG. 8. These six coils (A-2) (odd numbered coils) are also identified in FIG. 5.

By selecting current frequencies and phase relationships as previously described in connection with. FIG. 4 for the three sets of coils identified in FIG. 5 (i.e., a "main" set of all twelve coils C1–C12, and two "additional" sets, A-1 and A-2, of six coils each), a main rotating field and counter-rotating pair of additional fields can be generated. Likewise, other patterns of superimposed rotating fields can be generated dependent upon the additional currents cause to flow through selected and individually accessible coils.

In the foregoing example, three power supplies are connected in parallel to the three sets of coils so that both the "main" currents (e.g., at a frequency f1) and the "additional" currents (e.g., at respective frequencies of f2 and f3) are simultaneously flowing through the various coils.

Another arrangement for driving the stator coils of a twelve coil, 3-phase, 4-pole motor is now described.

As previously described, with all the terminals of the twelve coils being accessible, the various individual coils can be externally interconnected in accordance with the wiring arrangement shown in FIG. 6 (for conventional, internally wired 4-pole motors). When so externally connected, the "main" currents through all the coils are identical, but varying in phase and direction. Because of this, it is possible to rearrange the wiring scheme shown in FIG. 6, where all twelve coils are directly wired together, to those shown in FIGS. 9–12 where the twelve coils are wired into separate units of three coils each. FIG. 9, for example, consists of the three left-hand most coils (C1, C5 and C9) shown in FIG. 6. The phase relationships and directions of the currents in the coils C1, C5 and C9 in the FIG. 9 unit are identical to those in the coils C1, C5 and C9 in the FIG. 6 configuration. The same magnitude of currents is obtained simply by changing the voltage amplitude of the 3-phase current supply. When all the FIGS. 9–12 coil units are energized by a common 3-phase power supply, as indicated in the figures, a 4-pole "main" rotating magnetic field is generated.

Figure 11:
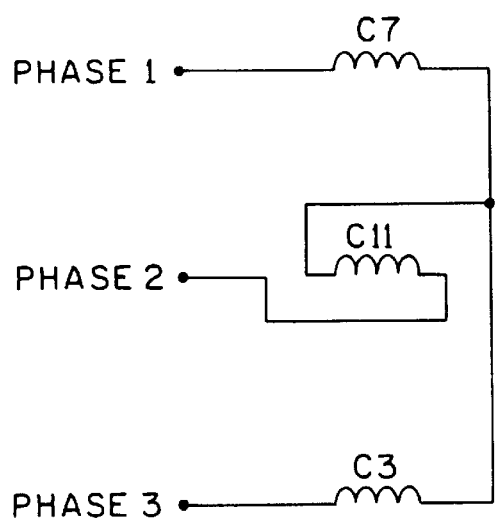
Figure 12:
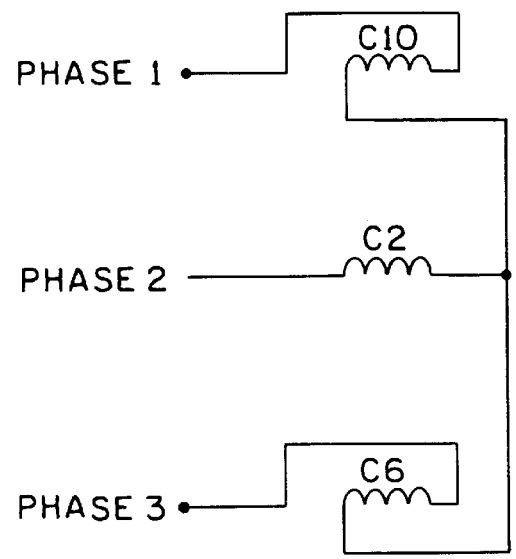

Additionally, by energizing only two of the units shown in FIGS. 9–12 with "additional" currents, an additional 2-pole rotating field is generated. The coil units shown in FIGS. 10 and 12, for example, correspond to the six coils shown in FIG. 7 for a "first" 2-pole rotating field, and the coil units shown in FIGS. 9 and 11 correspond to the six coils shown in FIG. 8 for a "second" 2-pole rotating field. In this illustrative embodiment, the "main" 4-pole field is to rotate in the counterclockwise direction (in FIG. 5), and the first 2-pole field generated by the coil units shown in FIGS. 10 and 12 rotates in the same direction. The coils of the two dipole units of coils shown in FIGS. 9 and 11 are energized in such manner (as previously explained) that the second additional 2-pole field rotates in the opposite direction.

Of importance is that pairs of three-coil units effective for generating 2-pole rotating fields correspond, in terms of the coils involved, to the four three-coil units effective for generating a 4-pole rotating field.

Figure 13:
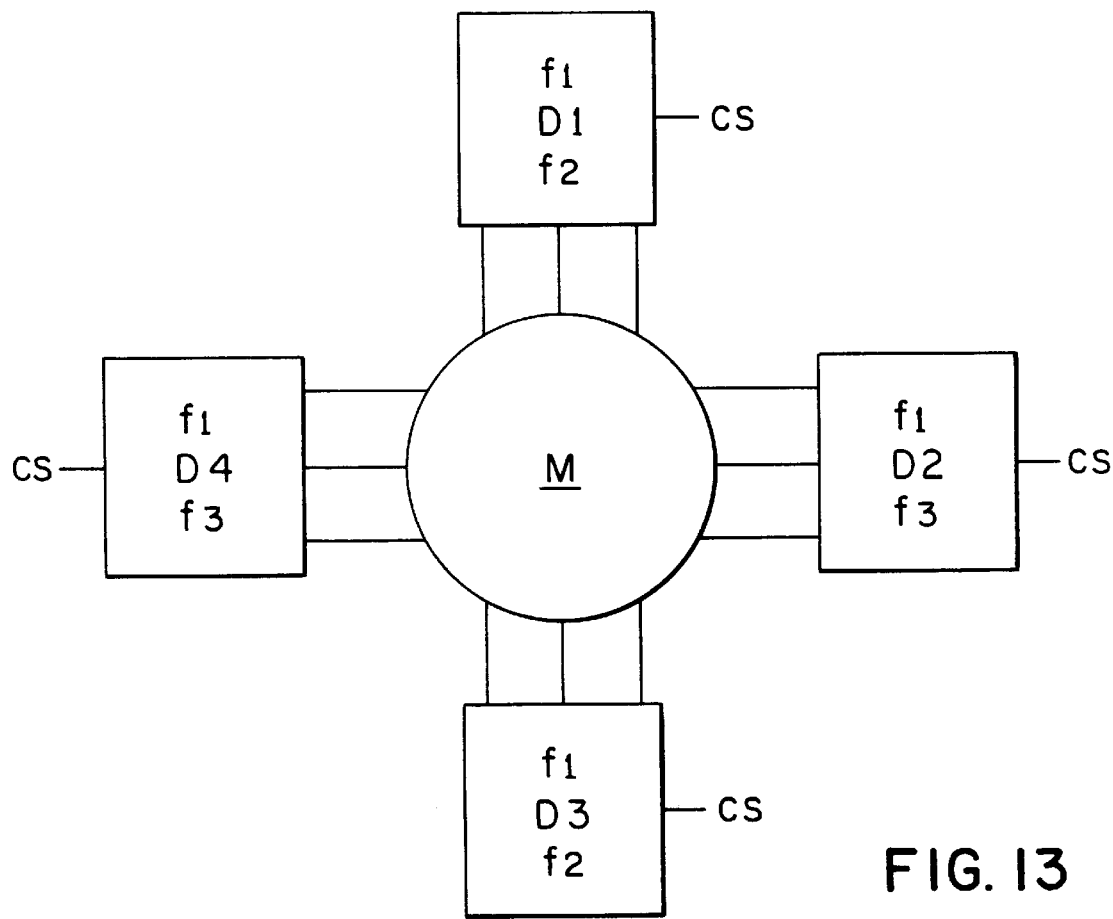
FIG. 13 shows how the coil units shown in FIGS. 9–12 can be energized in accordance with this invention.

Accordingly, one control arrangement for an otherwise conventional 3-phase, 4-pole motor m is as shown in FIG. 13, where the twelve stator coils are grouped into four units of three coils each as shown in FIGS. 9–12, and each unit is driven by a separate motor drive unit D1–D4. Each motor drive unit provides, under control by a control signal CS from a computer or the like, two 3-phase currents of selected frequency and selected phase relationships.

For example, for generating three rotating magnetic fields, in accordance with the embodiment of the invention illustrated in FIG. 4, all the four drive units D1–D4 provide identical and in-phase "main" 3-phase currents of a first frequency (f1). By applying such main currents to all twelve coils of the four units of coils, a main, 4-pole rotating field (FIG. 1) is generated. Drive units 1 and 3 additionally provide identical in-phase, 3-phase currents at a second frequency (f2) for generating a first additional 2-pole rotating field by means of the two coil units controlled by the two motor drive units 1 and 3. Drive units 2 and 4 similarly additionally provide identical in-phase, 3-phase currents but at a third frequency (f3) for generating a second additional 2-pole rotating field rotating in a direction opposite to the first additional 2-pole field by means of the two coil units controlled by the motor drive units 2 and 4. The three superimposed rotating fields produce a fixed direction unbalanced force, as previously described.

An advantage of the arrangement shown in FIG. 13 is that motor drive units capable of providing currents of the type needed in accordance with this invention are commercially available. Also, they are effective and quite flexible in use, whereby various different patterns of superimposed rotating magnetic fields can be generated as required.

In the foregoing described examples, conventional 4-pole, 3-phase induction motors are used without modification of the stator windings except that, as described, access is provided to individual coils, or groups of coils, for generating the superimposed magnetic fields. An alternate arrangement, not presently the preferred arrangement, is that of adding additional stator windings for generating the additional magnetic fields. For example, a single motor can have three separate sets of stator windings superimposed upon one another; one being a conventional 4-pole stator winding and the other two being conventional 2-pole windings. Each set is individually accessible for being individually energized by separate current sources.

As explained, the inventive method comprises deliberately creating internal unbalanced forces on a motor rotor for counteracting unwanted externally induced forces. Following is an analysis of the interaction of stator magnetic fields and rotor currents for creating unbalanced forces on an induction motor rotor.

The analysis, mathematical in nature, is illustrated with an example based upon the parameters of an existing, commercially available motor. As explained, the additional currents for providing the additional magnetic field or fields can be applied via separate ("selected") stator coils provided solely for that purpose or, preferably, by providing access to selected ones of existing stator coils as necessary. "Additional" currents are thus applied to "additional" coils (however obtained) for generating "additional" magnetic fields.

ANALYSIS

Force generation in an induction motor is a result of an interaction between the rotating magnetic field and currents induced in rotor bars by that field. According to Lorentz' law, the force F induced on the rotor bar is given by:

$$F = IlB \sin \theta \quad (1)$$

where
- I=magnitude of current in the rotor bar;
- l=length of the rotor bar;
- B=magnitude of the magnetic flux density vector;
- Θ=the angle between the bar and the flux density vector.

Therefore the targets of the force analysis are the rotor current and the magnetic flux density components.

The basis of this analysis is a mathematical model reflecting major features of the real motor. Development of this model starts here with a representation of the magnetic field. If frequency of the stator current is $\omega_1$ and number of poles pairs is $N_{s1}$, the rotating magnetic flux density B in a cylindrical coordinate system (x,r, θ) fixed to the stator can be represented as a real part of the following expression:

$$B_1(r, \theta, t) = B_{m1}(r) e^{j(\omega_1 t - N_{s1}\theta)} \quad (2)$$

where t=time, $B_{m1}$=amplitude, and $j=\sqrt{-1}$. The rotational angular velocity of this field is equal to $\omega_1/N_{s1}$.

For the sake of simplicity of the model, we assume that

The induction motor can be treated as a 2-D model associated with a cross section perpendicular to the motor axis. All values for the real motor forces can be estimated as a product of the values for a "2-D model" multiplied by the length of the motor.

The stator coils and the rotor bars are represented by the concentric conducting circles (sheets when projected axially) In order to calculate current density distribution in the rotor sheet, an effective sheet thickness δ is introduced. The value of δ is found from a requirement that the cross sectional area of the bars should equal the cross sectional area of the current sheet.

The model is linear in terms of superposition of the magnetic fields induced by currents with different frequencies and number of poles. No mutual distortions in the magnetic fields will occur when the total stator current is a sum of the quadruple current $J_{s1}$, and two dipole currents $J_{s2}$, $J_{s3}$:

$$J_s(\theta,t) = J_{s1}(\theta,t) + J_{s2}(\theta,t) + J_{s3}(\theta,t) = \hat{J}_{s1} e^{j(\omega_1 t - N_{s1}\theta)} + \hat{J}_{s2} e^{j(\omega_2 t - N_{s2}\theta)} + \hat{J}_{s3} e^{j(\omega_3 t - N_{s3}\theta)} \quad (3)$$

where: $\omega_1$ and $N_{s1}$ are the frequency and number of pole pairs for the quadruple main "coil" ($\omega_1 = 2\pi f_1$, $f_1$ is the 1200 Hz maximum drive current frequency; $N_{s1}=2$);

$\omega_2$, $N_{s2}$ and $\omega_3$, $N_{s3}$ are the frequencies and the poles pairs for the dipole coils ($\omega_2$ and $\omega_3$ to be specified, $N_{s2}=N_{s3}=1$). The total rotor current is also the linear superposition of the currents associated with the quadruple and dipole magnetic fields. At the same time, the proposed model is nonlinear in terms of force determination in that, according to equation (1), the force is a product of the superimposed currents and magnetic fields. In other words, any force component is equal to the sum of cross-products of all currents and flux densities. These cross products make the force nonlinear.

The frequency of the current is sufficiently small to neglect eddy current effects in the motor. This means that the model does not include the effects of the eddy currents and the losses associated with them, thus Helmholz's equation for vector potential of the magnetic field reduces to Laplace's equation.

Figure 14:
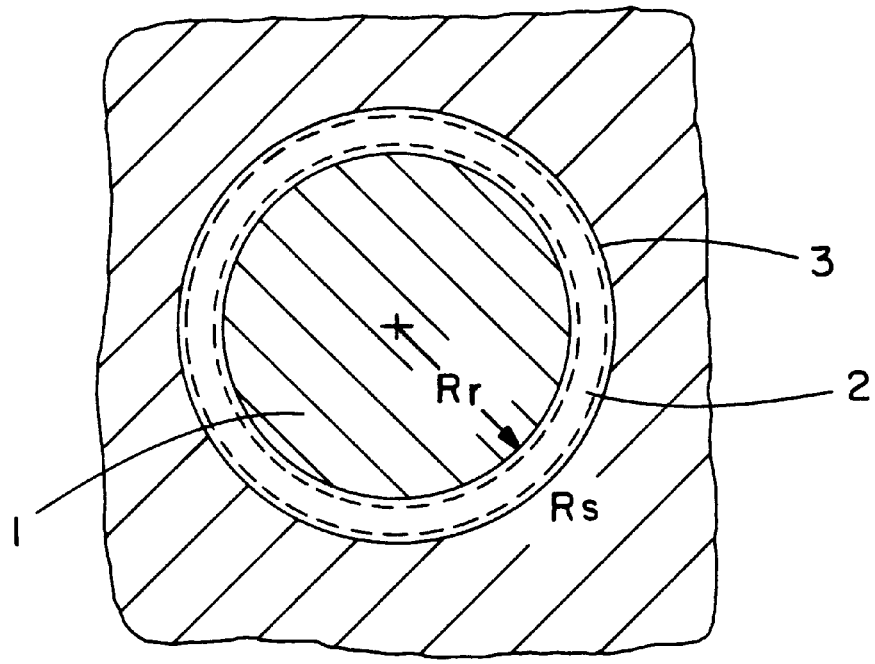
FIG. 14 is a cross-sectional view of a theoretical model of the motor for illustrating various parameters used in an analysis of an embodiment of the invention.

A cross section of the real motor is replaced with two co-axial domains as shown in FIG. 14. A cylinder of radius $R_r$ models the rotor domain (domain # 1, $0 \leq r \leq R_r$) and has magnetic permeability ($\mu_0\mu_1$). The stator is represented by an infinite cylindrical domain and internal radius equal to the real stator radius $R_s$ (domain # 3, $R_s \leq r \leq \infty$) with magnetic permeability ($\mu_0\mu_3$). The air gap (domain # 2) resides between the stator and rotor and has magnetic permeability $\mu_0$. The terms $\mu_1$ and $\mu_3$ are relative permeabilities. The stator and rotor current sheets are placed in the air gap (see dashed lines in FIG. 14). The stator sheet is in close proximity to the internal stator radius, and the rotor sheet is close to the rotor.

The proposed model and assumptions cover major features of the real motor and provide realistic relationships between currents, frequencies, rotational velocity, and forces.

To find the transverse force we must determine the magnetic fluxes and currents. We will use a traditional approach and treat the problem as a 2-D boundary value problem for a vector potential A.

Introducing the vector potential A, one can use the following relationship between A and the magnetic flux density B:

$$\vec{B} = \nabla \times \vec{A} \quad (4)$$

In 2-D problems the vector potential has only an x-component (we omit a subscript 'x' for simplicity) and $$B_\theta = -\frac{\partial A}{\partial r}; B_r = \frac{1}{r}\frac{\partial A}{\partial \theta} \quad (5)$$

We assume that due to low frequency of the currents, the vector potential satisfies Laplace's equation:

$$\nabla^2 A \equiv \frac{\partial^2 A}{\partial r^2} + \frac{1}{r}\frac{\partial A}{\partial r} + \frac{1}{r^2}\frac{\partial^2 A}{\partial \theta^2} = 0 \quad (6)$$

and the following boundary conditions $$A_i = A_e; \frac{1}{\mu_i \mu_0} \frac{\partial A_i}{\partial r} = \frac{1}{\mu_e \mu_0} \frac{\partial A_e}{\partial r} \quad (7)$$

where 'i' refers to inner, and 'e' to outer boundary value of the vector potential, respectively.

To find the vector potential associated with the current $J_{s1}$, one can use the fundamental solution to the equation (6) and the previous expression for the current density:

$$A_{s1}(r, \theta, t) = \int_0^{2\pi} \hat{J}_{s1} e^{j(\omega_1 t - N_{s1}\theta')} \left\{ \frac{\mu_s \mu_0}{2\pi} \ln R \right\} R_s d\theta' \quad (8)$$

where R=distance between point of interest (r,θ) and current point at the current sheet ($R_s$, θ'):

$$R^2 = r^2 + R_s^2 - 2rR_s \cos(\theta - \theta') \quad (9)$$

After integration, we have the vector potential related to the main coil:

$$A_{sI}(r, \theta, t) = \qquad (10)$$

$$-\frac{\mu_0}{2N_{sI}} R_s \hat{J}_{sI} \left(\frac{r}{R_s}\right)^{N_{sI}} e^{j(\omega_1 t - N_{sI}\theta)} = \hat{J}_{sI} \hat{A}_{sI}(r) e^{j(\omega_1 t - N_{sI}\theta)}$$

where $$\hat{A}_{sI}(r) = -\frac{\mu_0 R_s}{2N_{sI}}\left(\frac{r}{R_s}\right)^{N_{sI}}$$

Formula (10) is valid for $R_s > r$. For $R_s < r$ the term $(r/R_s)$ should be replaced with $(R_s/r)$.

Formula (10) provides the vector potential in an infinite medium having magnetic permeability $\mu_0$. To take into account the boundaries between areas with different $\mu$, one needs to introduce additional harmonic functions (particular solutions to Laplace equation). Considering the main coil contribution and the field caused by the rotor current, we have the following expressions for the vector potential:

Domain #1 ($0 \leq r \leq R_r$):

$$A(r,\theta,t) = \vec{A}_1(r) e^{j(\omega_1 t - N_{s1}\theta)} \qquad (11)$$

$$\vec{A}_1(r) = C_1 r^{N_{s1}} = C_1^R r^{N_{s1}} + jC_1^I r^{N_{s1}} \qquad (12)$$

Domain #2 ($R_r \leq r \leq R_s$):

$$A(r,\theta,t) = \vec{A}_2(r) e^{j(\omega_1 t - N_{s1}\theta)} \qquad (13)$$

$$\hat{A}_2(r) = C_2 r^{N_{sI}} + \frac{D_2}{r^{N_{sI}}} + \hat{A}_{sI}(r) + \hat{A}_{rI}(r) = \qquad (14)$$

$$(C_2^R + jC_2^I) r^{N_{sI}} + \frac{D_2^R + jD_2^I}{r^{N_{sI}}} + \hat{A}_{sI}(r) + \hat{A}_{rI}(r)$$

Domain #3 ($R_s \leq r \leq \infty$):

$$A(r,\theta,t) = \vec{A}_3(r) e^{j(\omega_1 t - N_{s1}\theta)} \qquad (15)$$

$$\hat{A}_3(r) = \frac{D_3}{r^{N_{sI}}} = \frac{D_3^R + jD_3^I}{r^{N_{sI}}} \qquad (16)$$

Here $C_1$, $C_2$, $D_2$, $D_3$ are the unknown complex coefficients (real and imaginary parts are designated with superscripts R and I, respectively), and $A_{r1}$ is the vector potential related to the rotor current:

$$A_{rI}(r, \theta, t) = \int_0^{2\pi} \hat{J}_{rI} e^{j(\omega_1 t - N_{sI}\theta')} \left\{\frac{\mu \mu_0}{2\pi} \ln R\right\} R_r d\theta' = \qquad (17)$$

$$-\frac{\mu_0}{2N_{sI}} R_r \hat{J}_{rI} \left(\frac{r}{R_r}\right)^{N_{sI}} e^{j(\omega_1 t - N_{sI}\theta)} = \hat{J}_{rI} \hat{A}_{rI}(r) e^{j(\omega_1 t - N_{sI}\theta)}$$

-continued $$\hat{A}_{rI}(r) = -\frac{\mu_0 R_r}{2N_{sI}}\left(\frac{r}{R_r}\right)^{N_{sI}} \qquad (18)$$

The amplitude of the rotor current $\vec{J}_{r1}$ is an unknown complex value too. The rotor current can be found from Faraday's law of induction:

$$J_{r1} = \delta\sigma E = \delta\sigma(E^{(1)} + E^{(2)}) \qquad (19)$$

where $\sigma$=copper conductivity; $E^{(1)}$=electric field strength due to time variation of the total magnetic field:

$$\nabla \times \vec{E}^{(1)} = -\frac{\partial \vec{B}}{\partial t} \qquad (20)$$

and the second component $E^{(2)}$ is due to the motion of the rotor in the magnetic field:

$$\vec{E}^{(2)} = \vec{V} \times \vec{B} \qquad (21)$$

Here V is the linear velocity of the rotor ($V = i_\theta \omega_m R_r$, $\omega_m$=mechanical angular velocity of the rotor). Because of relationship (4) between the magnetic flux density and vector potential we have for the total electric field strength:

$$\vec{E} = -\frac{\partial}{\partial t}\vec{A} - \omega_m \frac{\partial}{\partial \theta}\vec{A} \qquad (22)$$

and the rotor current is equal to $$J_{rI} = -\delta\sigma\left(\frac{\partial}{\partial t}A + \omega_m \frac{\partial}{\partial \theta}A\right) \qquad (23)$$

Here A is the total vector potential at the rotor current sheet. Since the rotor sheet is located in the domain #2, the vector potential in the formulas (22) and (23) is evaluated at $r=R_r$: $A=A_2(R_r)$.

Substituting A from (14) into (23) we have for the rotor current:

$$J_{rI} = -j\delta\sigma(\omega_1 - \omega_m N_{sI}) \hat{A}(R_r) e^{j(\omega_1 t - N_{sI}\theta)} = -j\delta\sigma(\omega_1 - \omega_m N_{sI}) \left[C_2 R_r^{N_{sI}} + \frac{D_2}{R_r^{N_{sI}}} - \frac{\hat{J}_{rI} \mu_0 R_r}{2N_{sI}} + \hat{A}_{sI}(R_r)\right] e^{j(\omega_1 t - N_{sI}\theta)} \qquad (24)$$

Recalling that $$J_{r1} = \vec{J}_{r1} e^{j(\omega_1 t - N_{s1}\theta)} \qquad (25)$$

we obtain the following solution for the rotor current amplitude:

$$\hat{J}_{rI} = \qquad (26)$$

$$\frac{-j\delta\sigma(\omega_1 - \omega_m N_{sI})}{1 - j\delta\sigma(\omega_1 - \omega_m N_{sI})\mu_0 \frac{R_r}{2N_{sI}}} \left[C_2 R_r^{N_{sI}} + \frac{D_2}{R_r^{N_{sI}}} + \hat{A}_{sI}(R_r)\right]$$

Note, that the term $(\omega_1 - \omega_m N_{s1})$ is the so-called slip of the induction motor. Also note that at a synchronous rotor speed $\omega_m = \omega_1/N_{s1}$ the rotor current is equal to zero and all forces on the rotor are zero.

The eight unknowns $C_1^R, C_1^I, C_2^R, C_2^I, D_2^R, D_2^I, D_3^R, D_3^I$ can be found from the system of linear algebraic equations derived by the boundary conditions (7). There are 8 equations: 2 boundaries×2 boundary conditions per each boundary×2 (real and imaginary parts)=8. These equations should be solved for all components of the stator current: main and two additional (a procedure for the main current illustrated above only). Equations (4)–(26) are valid not only for main current but for dipole components too. The only difference is in input values: instead of $J_{s1}$, $\omega_1$, $N_{s1}$ one should use $J_{s2}$, $\omega_2$, $N_{s2}$ and $J_{s3}$, $\omega_3$, $N_{s3}$.

For an express analysis of the forces, their frequencies and space orientation, the mathematical model can be simplified further. We assume that the magnetic permeability of the rotor and stator is infinite ($\mu_1 = \mu_3 = \infty$). Estimations based on the complete model show that the use of this assumption (instead of real numbers $\mu_1 = \mu_3 = 1600$) results in 3–5% overestimation for the forces. This error is small enough to neglect its effect on the model accuracy.

In the following simplified analysis we will use the infinite magnetic permeability for the stator and rotor material. In accordance with this model, the real parts of the rotor current and the magnetic flux components associated with the main stator current are equal to $$J^R_{r1}(t,\theta) = J_{r1c} \cos(\omega_1 t - N_{s1}\theta) + J_{r1s} \sin(\omega_1 t - N_{s1}\theta) \tag{27}$$

$$B^R_{r1}(t,\theta) = B_{r1c} \cos(\omega_1 t - N_{s1}\theta) + B_{r1s} \sin(\omega_1 t - N_{s1}\theta) \tag{28}$$

$$B^R_{\theta 1}(t,\theta) = B_{\theta 1c} \cos(\omega_1 t - N_{s1}\theta) + B_{\theta 1s} \sin(\omega_1 t - N_{s1}\theta) \tag{29}$$

where $$J_{r1c} = -\hat{J}_{s1} \frac{G_{m1}^2}{1 + G_{m1}^2}; \quad J_{r1s} = -\hat{J}_{s1} \frac{G_{m1}}{1 + G_{m1}^2}; \tag{30}$$

$$B_{r1c} = -\frac{\mu_0 R_r \hat{J}_{s1} G_{m1}}{(R_s - R_r)(1 + G_{m1}^2)}; \quad B_{r1s} = -\frac{\mu_0 R_r \hat{J}_{s1}}{(R_s - R_r)(1 + G_{m1}^2)};$$

$$B_{\theta 1c} = \frac{\mu_0 R_r \hat{J}_{s1}}{N_{s1}(R_s - R_r)(1 + G_{m1}^2)};$$

$$B_{\theta 1s} = -\frac{\mu_0 R_r \hat{J}_{s1} G_{m1}}{N_{s1}(R_s - R_r)(1 + G_{m1}^2)};$$

$$G_{m1} = \delta \sigma \mu_0 \frac{R_r^2}{R_s - R_r}(\omega_1 - \omega_m N_{s1})$$

The function $G_{m1}$ shows the effects of the air gap size and slip.

Finally, the total rotor current $J_r$ and the components of the magnetic flux density $B_r$, $B_\theta$ associated with all three stator coils (currents) are as follows:

$$J_r(t,\theta) = J_{r1}(t,\theta) + J_{r2}(t,\theta) + J_{r3}(t,\theta) \tag{31}$$

$$B_r(t,\theta) = B_{r1}(t,\theta) + B_{r2}(t,\theta) + B_{r3}(t,\theta) \tag{32}$$

$$B_\theta(t,\theta) = B_{\theta 1}(t,\theta) + B_{\theta 2}(t,\theta) + B_{\theta 3}(t,\theta) \tag{33}$$

The values with the indexes 2 and 3 are taken from the formulas (27)–(30) by replacing the values with index 1 with 2 and/or 3. The linearity of the model allows us to introduce phase angle $\phi_2$ between the additional stator current (# 2) and the main current (# 1), and the phase angle 3 between the additional stator current (# 3) and the main current # 1:

$$J^R_{r2}(t,\theta) = J_{r2c} \cos(\omega_2 t - N_{s2}\theta + \phi_2) + J_{r2s} \sin(\omega_2 t - N_{s2}\theta + \phi_2) \tag{34}$$

$$B^R_{r2}(t,\theta) = B_{r2c} \cos(\omega_2 t - N_{s2}\theta + \phi_2) + B_{r2s} \sin(\omega_2 t - N_{s2}\theta + \phi_2) \tag{35}$$

$$B^R_{\theta 2}(t,\theta) = B_{\theta 2c} \cos(\omega_2 t - N_{s2}\theta + \phi_2) + B_{\theta 2s} \sin(\omega_2 t - N_{s2}\theta + \phi_2) \tag{36}$$

$$J^R_{r3}(t,\theta) = J_{r3c} \cos(\omega_3 t - N_{s3}\theta + \phi_3) + J_{r3s} \sin(\omega_3 t - N_{s3}\theta + \phi_3) \tag{37}$$

$$B^R_{r2}(t,\theta) = B_{r3c} \cos(\omega_3 t - N_{s3}\theta + \phi_3) + B_{r3s} \sin(\omega_3 t - N_{s3}\theta + \phi_3) \tag{38}$$

$$B^R_{\theta 3}(t,\theta) = B_{\theta 3c} \cos(\omega_3 t - N_{s3}\theta + \phi_3) + B_{\theta 3s} \sin(\omega_3 t - N_{s3}\theta + \phi_3) \tag{39}$$

The torque Q(t) on the rotor is given by integration over the rotor conducting sheet:

$$Q(t) = LR_r^2 \int_0^{2\pi} J_r(t,\theta) B_r(t,\theta) d\theta \tag{40}$$

Mechanical power is a product of the averaged torque and the mechanical angular velocity $\omega_m$:

$$P = \omega_m Q_{av} = \frac{\omega_m}{T} \int_0^T Q(t) dt, \quad T = \frac{2\pi}{\omega_m} \tag{41}$$

Where L=length of the rotor; T=time of one revolution; $Q_{av}$=time averaged torque. The mechanical power is proportional to the square $J_{s1}^2$ of the main stator current.

Analysis of harmonic content of the rotor torque points to the existence of a component with frequency equal to the difference between the dipole current frequencies $\omega_2 - \omega_3$. This component occurs due to integration of the cross-products of the harmonics.

The components of the transverse force $F_x(t)$ (horizontal) and $F_y(t)$ (vertical) are given in the following integrals:

$$F_x(t) = -LR_r \int_0^{2\pi} J_r(t,\theta)[B_r(t,\theta)\sin(\theta) + B_\theta(t,\theta)\cos(\theta)] d\theta \tag{42}$$

$$F_y(t) = -LR_r \int_0^{2\pi} J_r(t,\theta)[B_\theta(t,\theta)\sin(\theta) - B_r(t,\theta)\cos(\theta)] d\theta \tag{43}$$

Owing to interaction between the harmonics, the transverse force components have frequencies equal to $\omega_1 - \omega_2$ and $\omega_1 - \omega_3$. The magnitudes of these harmonics are proportional to the products $J_{s1} \cdot J_{s2}$ and $J_{s1} \cdot J_{s3}$ respectively.

Using the proposed simplified mathematical model, the transverse force components are estimated. An operating point for the motor during operation is

| | |
|---|---|
| Main coil current | $I_1$ = 68 A rms |
| Maximum acceptable current in the additional coil (from the heat dissipation viewpoint): | $I_{2,3}$ = 7 A rms per coil |
| Drive current frequency (main coil) | $f_1$ = 1200 Hz |
| Desired frequency of the transverse force (first fundamental frequency of transverse vibration of a shaft) | $f_{fund,\ 1}$ = 75 Hz |

According to the model, we have the following relationships for the currents and transverse force frequencies $$f_1 - f_2 = f_{fund,1}; \quad f_1 - f_3 = -f_{fund,1} \tag{44}$$

The negative value for $f_{fund,\ 1}$ in the second formula (44) means that the third coil (second additional coil) should generate a dipole-type magnetic field rotating opposite to the first dipole direction. Therefore the frequencies for the first and second dipole currents are $$f_2 = f_1 - f_{fund,1} = 1200 - 750 = 450 \, Hz$$

$$f_3 = f_1 + f_{fund,1} < 1200 + 750 = 1950 \, Hz \quad (45)$$

To generate the transverse, force with time independent direction of action, the values of currents in the first and second additional coils must be the same:

$$J_{s2} = J_{s3} \quad (46)$$

Variation in space orientation of the transverse force can be achieved by the changing of the phase angles $\phi_2$ and $\phi_3$.

Figure 15:
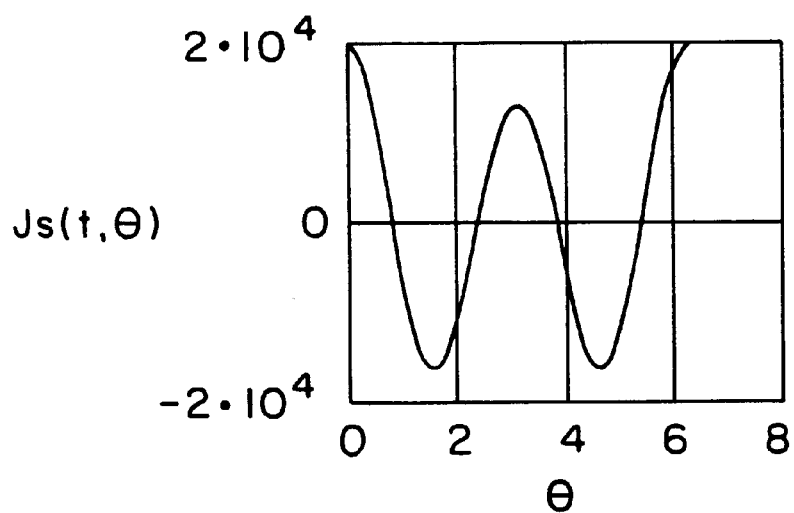
Figure 16:
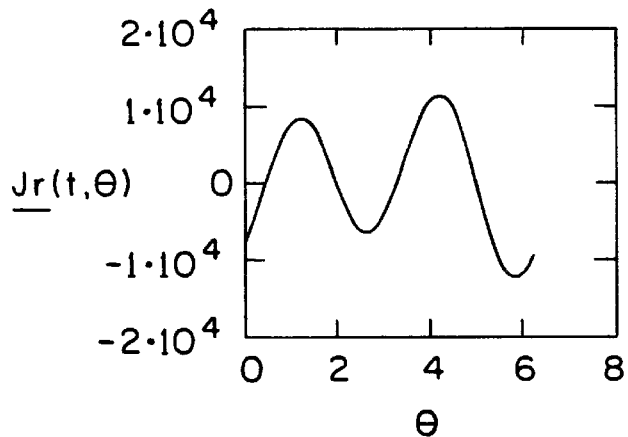

The sum of all stator currents and the total rotor current distribution (in units of A/m) are shown in FIG. 15 and 16, respectively, as a function of angle θ in a stator fixed coordinate system ($\phi_2 = \phi_3 = 0$).

Figure 17:
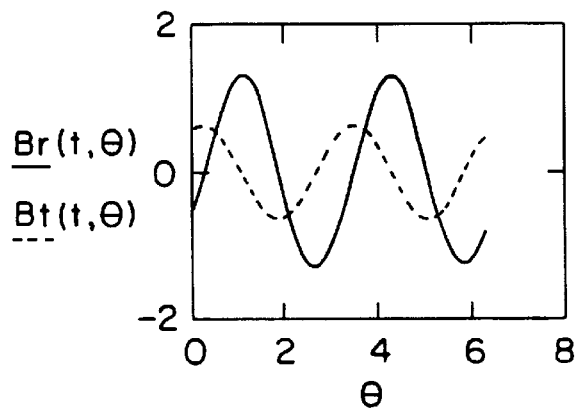
Figure 18:
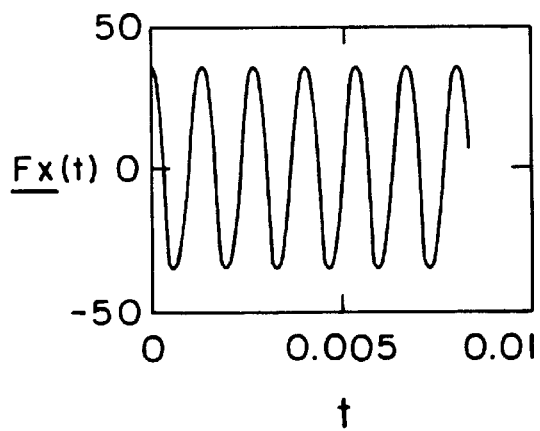
Figure 19:
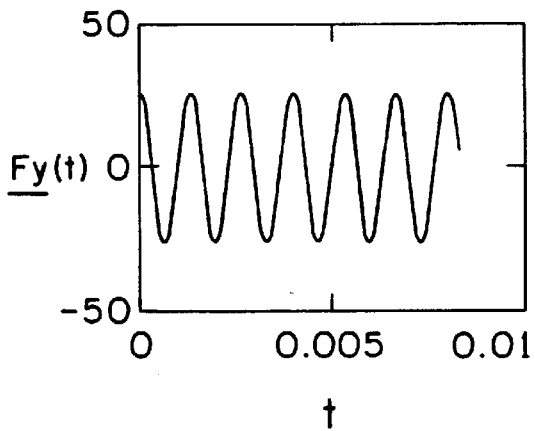

The radial and tangential components of the magnetic flux density (Wb/m$^2$) at the rotor current sheet are as shown in FIG. 17.

The time history of the transverse force (in Newtons) is shown in FIG. 18–21 respectively for the horizontal $F_x$ (t) and vertical $F_y$ (t) components along with the ratios $F_x$ (t)/$F_t$ and $F_y$ (t)/$F_t$, where $F_t = Q_{av}/R_r$–tangential force associated with the motor torque.

Figure 20:
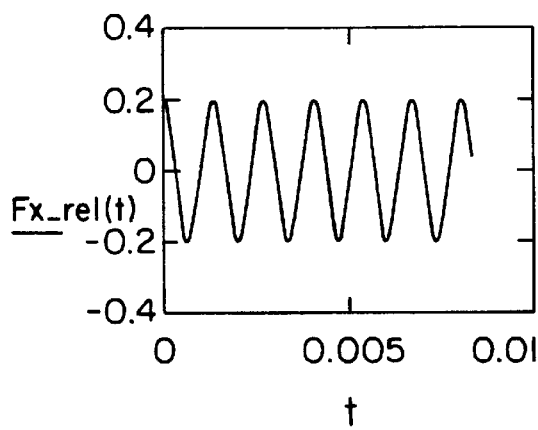
Figure 21:
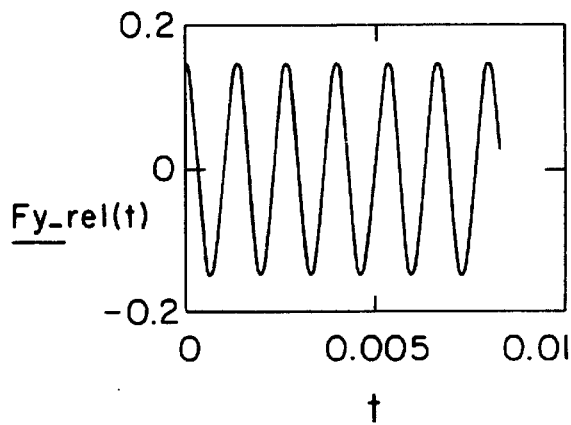
Figure 22:
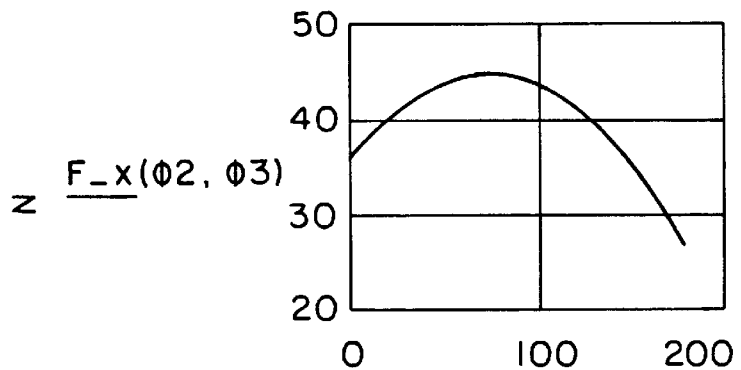
Figure 23:
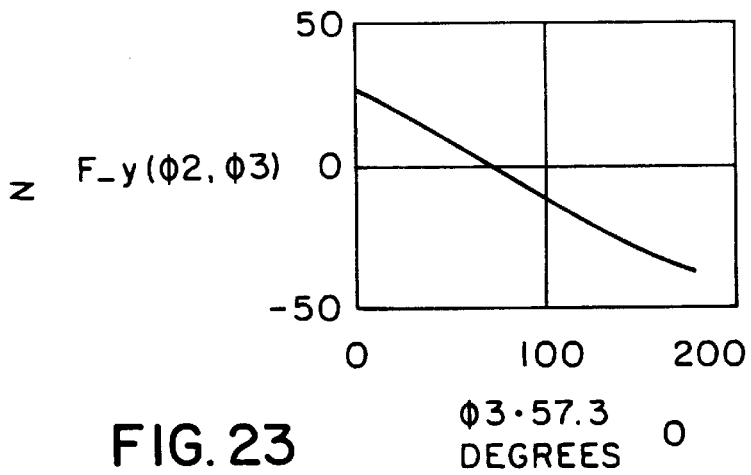
Figure 24:
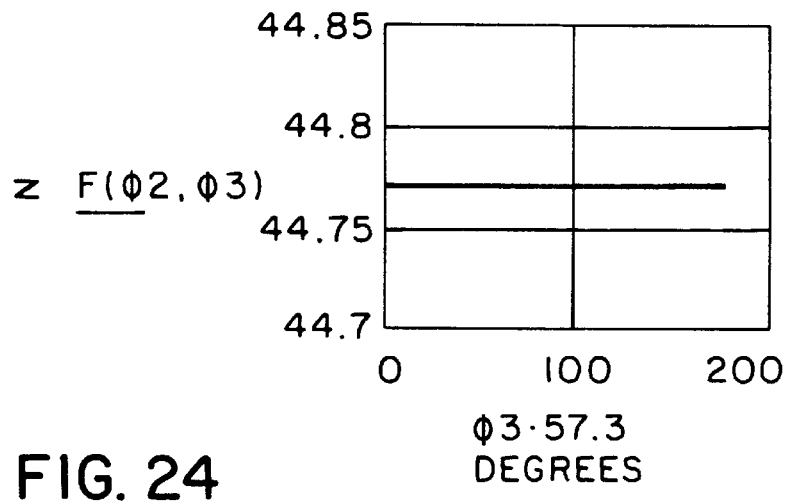
Figure 25:
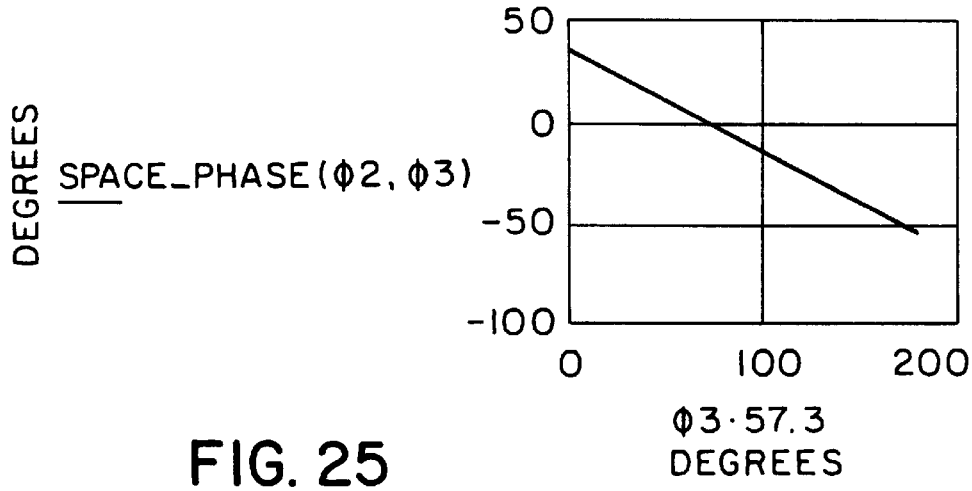

It can be seen from FIG. 20 and 21 that the magnitude of the transverse force is about 20% of the magnitude of the tangential force associated with torque. The horizontal and vertical components are in phase, and therefore there is no time variation in the force space orientation. In other words, the transverse force is "polarized". If currents $J_{s2}$ and $J_{s3}$ are not equal, $J_{s2} \neq J_{s3}$, the resultant transverse force will deviate in time from fixed direction.

If phase angle $\phi_2 = 0$ and $\phi_3$ varies in a range 0–180 degrees, the x- and y- components of the transverse force also vary, causing a variation in the direction of the resultant force. This means that the phase angle $\phi_3$ can control the space orientation of the transverse force without any influence on its magnitude. FIGS. 22–25 show variations of the force components and resultant as function of $\phi_3$.

It should be pointed out that the space angle of the transverse force is a linear function of the phase angle of the current.

Figure 26:
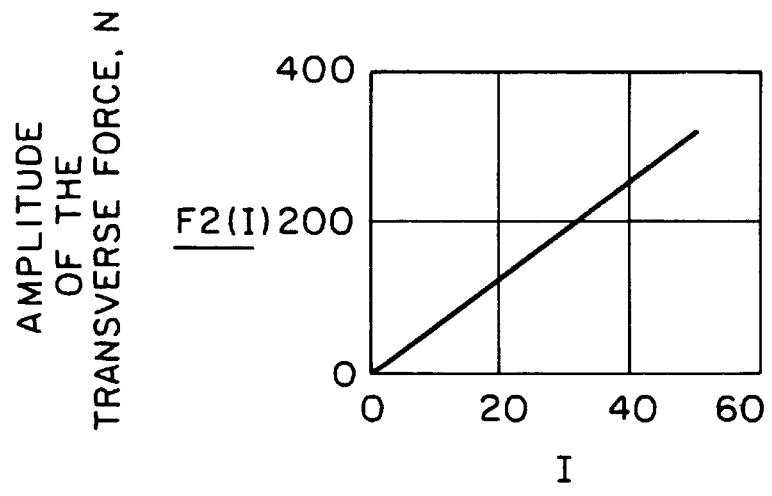

The amplitude of the transverse force as a function of the additional coil currents is shown in FIG. 26.

For this particular motor the slope of this straight line is 6.4 N/(A rms). Because of linearity this value can be used for estimation of the current needed to generate the transverse force with prescribed amplitude.

Upon analysis, it is found that
Generation of the transverse force on the rotor of a conventional induction motor is possible if in addition to the main driving current, two supplementary stator currents are supplied. These currents should create two 2-pole magnetic fields rotating in opposite directions.

The time frequency of the transverse force is equal to the difference between main current frequency $f_1$ and the additional currents frequencies $f_2$, $f_3$. To attack resonance vibration of the shaft with known frequency $f_{fund}$, additional frequencies are provided as follows:

$$f_2 = f_1 - f_{fund}$$

$$f_3 = f_1 + f_{fund}$$

Other additional currents can be used to generate the transverse force(s) aimed to suppress multiple resonances.

The magnitude of the transverse force is proportional to the value of the additional current.

Space orientation of the transverse force can be controlled by the phase angle between the main and additional currents. To provide this control the values of the additional currents should be the same: $I_2 = I_3$.

What is claimed is:

1. A method of operating a motor comprising a rotor connected to a shaft and a plurality of stator coils disposed around the rotor, said plurality of coils including main coils for generating a rotating main magnetic field for applying balanced, rotation producing tangential forces on electrically conducting bars on said rotor, the method comprising the steps of causing a main a.c. current at a first frequency to flow through said stator main coils for generating said main magnetic field, and causing a first additional a.c. current at a second frequency different from said first frequency to flow through a selected one of said stator coils for generating a first additional rotating magnetic field for generating an unbalanced transverse rotating force on said rotor.

2. A method according to claim 1 wherein said selected coil is in addition to said main coils.

3. A method according to claim 1 wherein said selected coil is one of said main coils.

4. A method according to claim 3 wherein said additional current is superposed on the main current flowing through said selected coil.

5. A method according to claim 1 including causing a second additional a.c. current at a third frequency different from said first and second frequencies to flow through a selected second of said stator coils for generating a second additional rotating magnetic field.

6. A method according to claim 5 wherein said first and second magnetic fields rotate in opposite directions with the same angular velocity for generating a stationary direction unbalanced transverse force F on said rotor varying in amplitude between +F and -F at a desired frequency, said second frequency being equal to said main current first frequency less said desired frequency, and said third frequency being equal to said main current first frequency plus said desired frequency.

7. A method according to claim 6 including controlling the electrical phase angle between said main and said first and second additional a.c. currents for controlling the orientation of said stationary direction unbalanced transverse force.

8. A method of operating an electrical motor for powering a work performing machine causing mechanical vibrations in the rotor shaft of the motor, the method comprising sensing the vibrations in the rotor shaft and, in response to said sensed vibrations, providing additional currents to a selected one of stator coils of said motor for generating an unbalanced transverse force on said rotor shaft for damping said machine induced vibrations.

9. A method according to claim 8 including characterizing said sensed vibrations as one of a plurality of pre-selected possibly occurring vibration modes and, in response to said characterization, providing one of a preselected pattern of possible additional currents for generating an unbalanced, transverse force on said rotor shaft for damping said one sensed vibration mode.

10. A method according to claim 8 for operating an a.c. motor powered by causing a.c. currents of a first frequency to flow through stator coils of the motor for causing continuous rotation of the motor rotor, and wherein said additional currents are a.c. currents provided to selected stator coils and being of a second frequency different from said first frequency.

11. A method according to claim 10 wherein said additional currents of said second frequency are superimposed upon a.c. currents of said first frequency provided to said selected stator coils.

12. A method according to claim 10 including continuously sensing the vibrations in the rotor shaft for sensing changes in the vibrations caused by the work performing machine, and varying parameters of said additional a.c. currents for changing the unbalanced transverse force applied against the rotor shaft in correspondence with the sensed changes for continuously damping said machine caused vibrations.

13. A method according to claim 10 wherein said additional currents additionally comprise currents of a third frequency different from said first and second frequencies.

14. A method according to claim 13 wherein said additional currents of said second and third frequencies are superimposed upon a.c. currents of said first frequency provided to said selected stator coils.

15. A motor comprising a rotor connected to a shaft and a plurality of stator coils disposed around the rotor, said plurality of coils including main coils for generating a rotating main magnetic field for applying balanced, rotary inducing tangential forces on electrically conducting bars on said rotor;
 means for supplying a main a.c. current to said stator main coils for generating said rotating main magnetic field; and
 means for supplying a first additional a.c. current through a selected one of said stator coils for generating a first additional rotating magnetic field on said main magnetic field for generating an unbalanced transverse force on said rotor.

16. A motor according to claim 15 wherein said selected coil is one of said main coils.

17. A motor according to claim 15 wherein said main a.c. current is at a first frequency and said first additional a.c. current is at a second frequency different from said first frequency.

18. A motor according to claim 17 including means for supplying a second additional a.c. current at a third frequency different from said first and second frequencies through a selected second of said stator coils for generating a second additional rotating magnetic field.

19. A motor according to claim 18 wherein said first and second additional rotating magnetic fields generate a stationary direction unbalanced transverse force F on said rotor varying in amplitude between +F and −F at a desired frequency, said second frequency of said first additional a.c. current being equal to said main current first frequency less said desired frequency, and said third frequency of said second additional a.c. current being equal to of amplitude variation of said unbalanced force, and said third frequency of said second additional a.c. current being equal to said main current first frequency plus said desired frequency variation frequency.

* * * * *

UNITED STATES PATENT AND TRADEMARK OFFICE
CERTIFICATE OF CORRECTION

PATENT NO. : 5,949,162
DATED : September 7, 1999
INVENTOR(S) : Victor G. Mishkevich, Gregory Weston Terpay and George G. Zipfel, Jr.

It is certified that error appears in the above-indentified patent and that said Letters Patent is hereby corrected as shown below:

Column 1, line 36, delete "fortes" and insert -- forces --
Column 7, line 42, delete "axially)"; insert -- axially).--
Column 9, line 27, delete " $\vec{A}_1$ " and insert -- $\hat{A}_1$ --
Column 9, line 29, delete " $\vec{A}_1$ " and insert -- $\hat{A}_1$ --
Column 9, line 34, delete " $\vec{A}_2$ " and insert -- $\hat{A}_2$ --
Column 9, line 44, delete " $\vec{A}_3$ " and insert -- $\hat{A}_3$ --
Column 9, line 63, delete " $d\theta$ " and insert -- $d\theta'$ --
Column 10, line 8, delete " $\vec{J}$ " and insert -- $\hat{J}_{r1}$ --
Column 10, line 20, delete "E$^{(2)}$)" and insert -- E$^{(2)}$ --
Column 12, line 2, delete "3" and insert -- $\phi_3$ --
Column 12, line 10, delete "B$^r_{r2}$" and insert -- B$^r_{r3}$ --
Column 12, line 60, delete "75 Hz" and insert -- 750 Hz --
Column 13, line 6, delete "<" and insert -- = --

Signed and Sealed this

Twenty-seventh Day of June, 2000

Attest:

Q. TODD DICKINSON

*Attesting Officer*  *Director of Patents and Trademarks*